(12) United States Patent
Smith (10) Patent No.: US 8,784,284 B1
(45) Date of Patent: Jul. 22, 2014

(54) INFANT MUSCLE TRAINING APPARATUSES AND METHODS

(76) Inventor: Jeff Smith, Ruston, LA (US)

(*) Notice: Subject to any disclaimer, the term of this patent is extended or adjusted under 35 U.S.C. 154(b) by 219 days.

(21) Appl. No.: 13/374,080

(22) Filed: Dec. 9, 2011

Related U.S. Application Data

(60) Provisional application No. 61/459,311, filed on Dec. 10, 2010.

(51) Int. Cl.
  *A61H 3/04* (2006.01)
  *A63B 25/08* (2006.01)
(52) U.S. Cl.
  USPC ............... 482/121; 482/77; 482/66; 482/68
(58) Field of Classification Search
  USPC ......... 482/121, 122, 123, 124, 125, 126, 35, 482/36, 66–69, 77; 434/258, 255; 297/5; 135/65, 67
  See application file for complete search history.

(56) References Cited

U.S. PATENT DOCUMENTS

| | | |
|---|---|---|
| 1,949,594 A | 3/1934 | Wiqhtman |
| 2,327,253 A | 8/1943 | Eisel |
| 2,437,241 A | 3/1948 | Burlin |
| 2,461,682 A | 2/1949 | Ferrari |
| 2,723,856 A | 11/1955 | Thomson |
| 2,785,503 A | 3/1957 | Schaefer |
| 3,184,883 A | 5/1965 | McCook |
| 4,359,242 A * | 11/1982 | Gerken et al. ............... 297/5 |
| 4,451,034 A * | 5/1984 | Gin ............................. 482/148 |
| 5,647,823 A | 7/1997 | Spence |
| 6,261,250 B1 * | 7/2001 | Phillips ........................ 601/23 |
| 6,537,077 B1 * | 3/2003 | Johnson ...................... 434/258 |
| 6,921,354 B1 | 7/2005 | Shifferaw |
| 7,044,892 B2 * | 5/2006 | Stern et al. .................. 482/35 |
| 7,438,674 B2 | 10/2008 | Sjodin |
| 2006/0258520 A1 * | 11/2006 | Bowser ........................ 482/121 |
| 2007/0066446 A1 * | 3/2007 | Gelfond et al. ............. 482/23 |

* cited by examiner

*Primary Examiner* — Loan H Thanh
*Assistant Examiner* — Megan Anderson
(74) *Attorney, Agent, or Firm* — R. Keith Harrison (57) ABSTRACT

An infant muscle training apparatus includes an apparatus base, an apparatus frame carried by the apparatus base and at least one assistance harness carried by the apparatus frame. The assistance harness has at least one resilient or elastic assistance band carried by the apparatus frame and a flexible, U-shaped arm strap carried by the assistance band.

16 Claims, 9 Drawing Sheets

INFANT MUSCLE TRAINING APPARATUSES AND METHODS

CROSS-REFERENCE TO RELATED APPLICATIONS

This application claims the benefit of U.S. provisional application No. 61/459,311, filed Dec. 10, 2010 and entitled INFANT MUSCLE TRAINING APPARATUSES AND METHODS, which provisional application is incorporated by reference in its entirety.

FIELD

Embodiments of the disclosure generally relate to muscle training apparatuses and methods for infants. More particularly, embodiments of the disclosure relate to infant muscle training apparatuses and methods which are suitable for strengthening or training the muscles of infants having muscular dystrophy or other muscular diseases or disorders.

BACKGROUND

Muscular dystrophy (MD) is a group of hereditary diseases which cause muscle weakness. The genetic basis for MD is the coding of defective proteins which are components of muscle tissue. Although there are over 100 diseases which have similarities to MD, several diseases are commonly grouped together as various forms of MD. These include Becker's, congenital, Duchenne, distal, Emery-Dreifuss, fascioscapulohumeral, limb-girdle, myotonic and oculopharyngeal muscular dystrophies.

One type of muscular dystrophy, known as congenital muscular dystrophy (CMD), is a group of genetic degenerative diseases which primarily affect voluntary muscles. The symptoms of CMD are often noted from birth. CMD may involve weakness of the facial and limb muscles and a generalized lack of muscle tone, any or all of which usually appear before the age of 9 months. CMD may be an autosomal dominant or recessive trait and may be inherited through either or both parents. In some cases, CMD may be the result of spontaneous mutation.

It has been found that regular resistance or assistance training of the arms and legs of infants with CMD considerably enhances the muscular strength and range-of-motion of the infant's arms and legs, facilitating muscular development and mobility of these infants as they mature into childhood.

SUMMARY

Embodiments of the disclosure are generally directed to an infant muscle training apparatus. An illustrative embodiment of the infant muscle training apparatus includes an apparatus base, an apparatus frame carried by the apparatus base and at least one assistance harness carried by the apparatus frame. The assistance harness has at least one resilient or elastic assistance band carried by the apparatus frame and a flexible, U-shaped arm strap carried by the assistance band.

Embodiments of the disclosure are further generally directed to an infant muscle training method for an infant having a muscular disease or disorder. An illustrative embodiment of the method includes providing an infant muscle training apparatus having at least one resilient or elastic band and having the infant generally apply resistance against the band or bands.

Embodiments of the disclosure are further generally directed to an infant muscle training program. An illustrative embodiment of the program includes training an infant using an infant muscle training apparatus having apparatus handles and at least one resistance band connecting the apparatus handles, training an infant using an infant muscle training apparatus with an infant play gym and at least one arm assistance harness and at least one leg assistance harness carried by the infant play gym, training an infant using an infant muscle training apparatus with an infant chair and at least one arm assistance harness suspended over the infant chair and training an infant using an infant muscle training apparatus with an infant-propelled infant walker, an apparatus frame carried by the infant walker and at least one arm assistance harness suspended over the infant walker.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. Moreover, the illustrative embodiments described herein are not exhaustive and embodiments or implementations other than those which are described herein and which fall within the scope of the appended claims are possible. All of the implementations described below are exemplary implementations provided to enable persons skilled in the art to make or use the invention and are not intended to limit the scope of the invention, which is defined by the claims. Furthermore, there is no intention to be bound by any expressed or implied theory presented in the preceding technical field, background, brief summary or the following detailed description.

Figure 1:
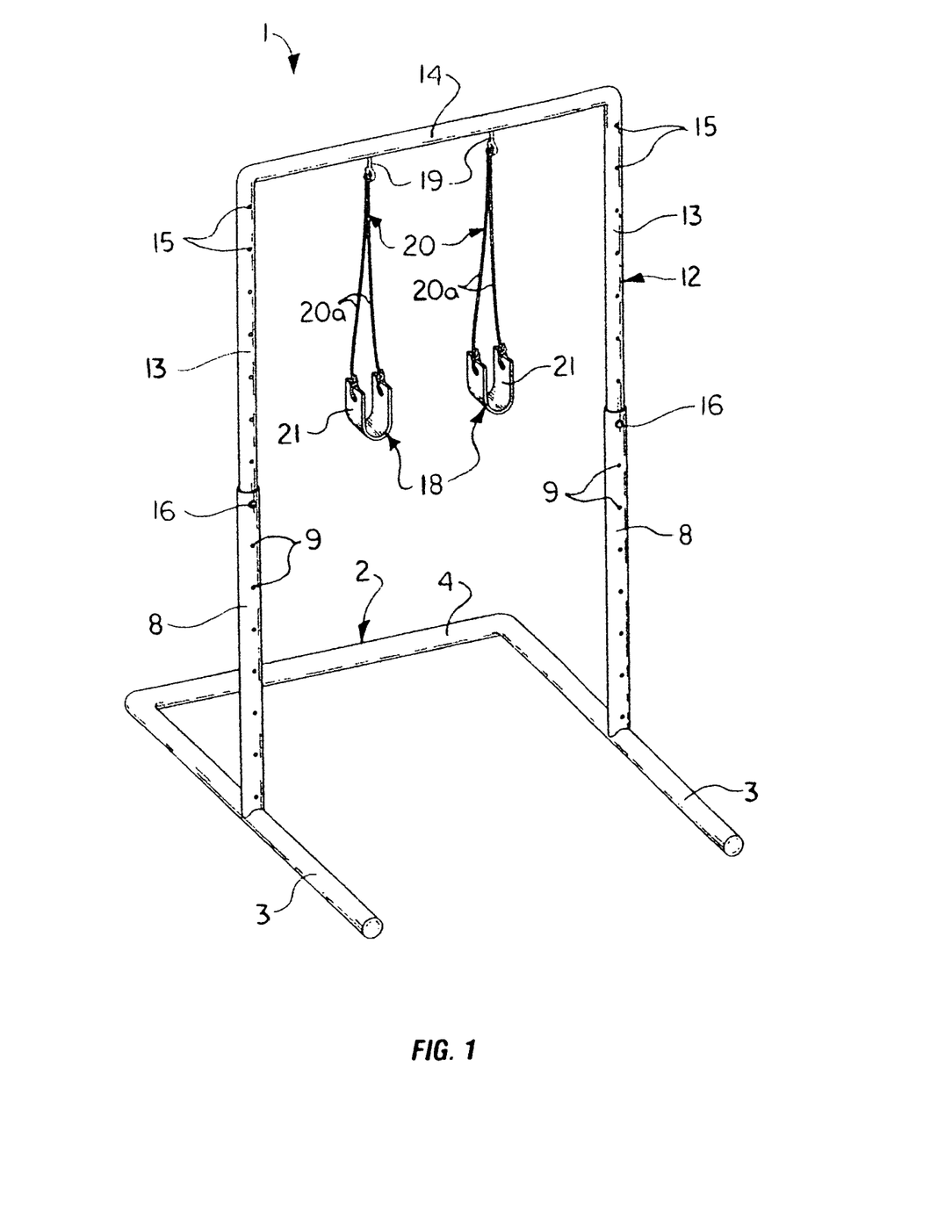
FIG. 1 is front perspective view of an illustrative embodiment of an infant muscle training apparatus.
Figure 2:
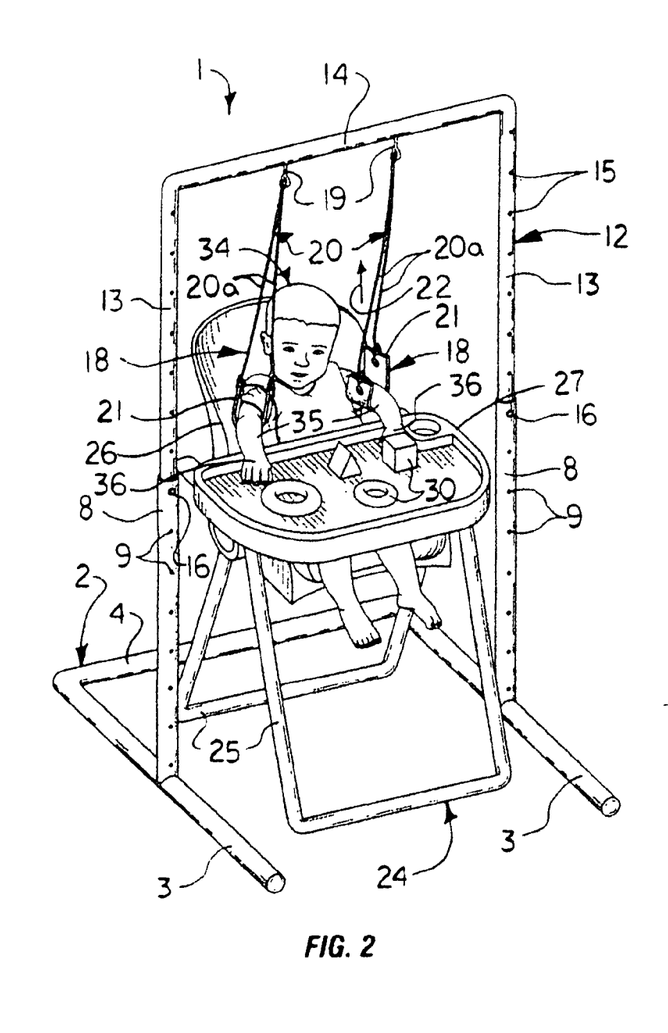
FIG. 2 is a front perspective view of the infant muscle training apparatus illustrated in FIG. 1, with an infant chair placed beneath a pair of arm assistance harnesses of the apparatus, an infant placed in the infant chair and the arms of the infant in the arm assistance harnesses as the infant manipulates toys on a tray of the infant chair in exemplary application of the apparatus.
Figure 3:
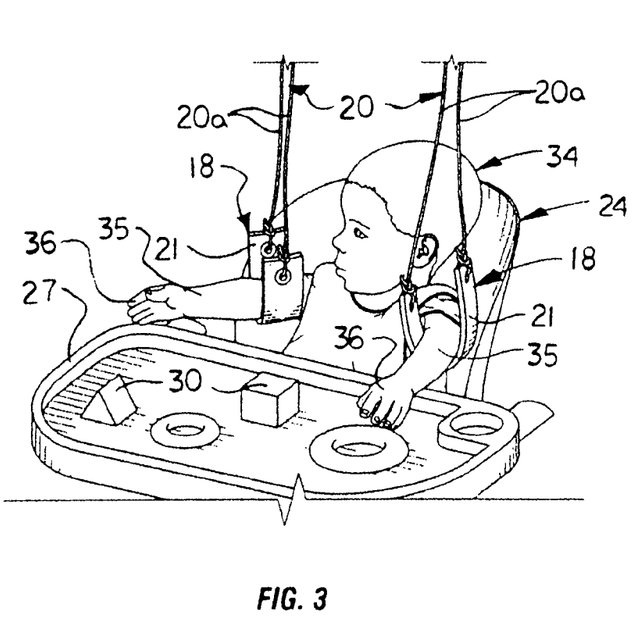
FIG. 3 is a perspective view, partially in section, of the infant muscle training apparatus, with the arm assistance harnesses of the apparatus applying upward assistance on the infant's arms as the infant manipulates the toys on the tray of the infant chair.

Referring initially to FIGS. 1-3 of the drawings, an illustrative embodiment of the infant muscle training apparatus, hereinafter apparatus, is generally indicated by reference numeral 1. The structural components of the apparatus 1 may be PVC (polyvinylchloride) piping, metal or composite materials, for example and without limitation. The apparatus 1 may include an apparatus base 2 and an apparatus frame 12 which is supported by the apparatus base 2. The apparatus base 2 and the apparatus frame 12 may have any design which is consistent with the functional requirements of the apparatus 1. In some embodiments, the apparatus base 2 may include a pair of generally elongated, parallel, spaced-apart side base members 3 and a connecting base member 4 which connects the side base members 3. The apparatus base 2 may further include a pair of generally elongated, parallel, spaced-apart, upward-standing frame support members 8 which extend from the respective side base members 3. Each of the frame support members 8 may have multiple, spaced-apart pin openings 9 the purpose of which will be hereinafter described.

The apparatus frame 12 of the apparatus 1 may include a pair of generally elongated, parallel, spaced-apart side frame members 13 which are supported by the respective frame support members 8 of the apparatus base 2 and a connecting frame member 14 which connects the side frame members 13. In some embodiments, the apparatus frame 12 may be selectively height-adjustable with respect to the apparatus base 2. Accordingly, the frame support members 8 of the apparatus base 2 may telescopically receive the respective side frame members 13 of the apparatus frame 12. A pin 16 may be extended through a selected pin opening 9 in each frame support member 8 of the apparatus base 2 and through a selected registering one of multiple, spaced-apart pin openings 15 provided in the corresponding side frame member 13 of the apparatus frame 12 to secure the apparatus frame 12 at the selected height with respect to the apparatus base 2. Alternative techniques known by those skilled in the art, such as clamps (not illustrated), for example and without limitation, may be used to secure the apparatus frame 12 at a selected height with respect to the apparatus base 2.

At least one arm assistance harness 18 may be suspended from the connecting frame member 14 of the apparatus frame 12. In some embodiments, a pair of adjacent, spaced-apart arm assistance harnesses 18 may be suspended from the connecting frame member 14, as illustrated. Each arm assistance harness 18 may include a generally elongated, resilient or elastic assistance band 20 which may be attached to the connecting frame member 14 according to any suitable technique which is known by those skilled in the art. For example and without limitation, in some embodiments, a pair of spaced-apart suspension hooks 19 may be attached to the connecting frame member 14. The assistance bands 20 of the arm assistance harnesses 18 may be tied or otherwise attached to the respective suspension hooks 19.

The assistance band 20 of each arm assistance harness 18 may include a pair of assistance band strands 20a. A flexible arm strap 21 may be attached to the lower ends of the respective assistance band strands 20a of each assistance band 20. The arm strap 21 of each arm assistance harness 18 may have a generally U-shaped cross-section. The apparatus 1 may have any alternative design which is consistent with the functional requirements of the apparatus 1.

As illustrated in FIGS. 2 and 3, in exemplary application, the apparatus 1 may be used to train and strengthen the arms 35 of an infant 34 which is afflicted with a muscular disease or disorder such as congenital muscular dystrophy (CMD), for example and without limitation. Accordingly, an infant chair 24 may be placed between the side base members 3 of the apparatus base 2 and beneath the apparatus frame 12 of the apparatus 1. The infant chair 24 may have a conventional infant high-chair construction with infant chair legs 25, an infant chair seat 26 on the infant chair legs 25 and an infant chair tray 27 on the infant chair seat 26.

The infant 34 is placed in the infant chair seat 26 of the infant chair 24. The arms 35 of the infant 34 are then extended through the arm straps 21 of the respective arm assistance harnesses 18. Various toys 30 may be placed on the infant chair tray 27 to engage the attention and interest of the infant 34. Accordingly, as the infant 34 manipulates the toys 30 on the infant chair tray 27 using his or her hands 36, the assistance bands 20 of the respective arm assistance harnesses 18 apply upward assistance 22 to the arms 35 of the infant 34 to raise the infant's arms 35 from the surface of the infant chair tray 27. Therefore, the infant 34 is able to move his or her arms 35 in a sideways, upward and downward motion with the upward assistance 22 of the resistance bands 20 to grip and manipulate the toys 30 on the infant chair tray 27. This continual or repeated downward, sideways and upward exertion of the infant's arms 35, made possible by the upward assistance 22 exerted by the assistance bands 20, strengthens the muscles in the arms 35 and shoulders of the infant 34. The foregoing procedure may be implemented as often as is necessary over a period of weeks or months to gradually strengthen the muscles in the arms 35 of the infant 34. In some applications, the procedure may be applied about 1~4 times per day over a period of days, weeks or months until the strength of the infant's arms 35 improves. The procedure may be continued for an indefinite period of time to maintain the strength of the infant's arms 35. It will be recognized and understood by those skilled in the art that the apparatus 1 may be used in a variety of alternative applications to facilitate strengthening of the legs and other body parts of the infant 34.

Figure 4:
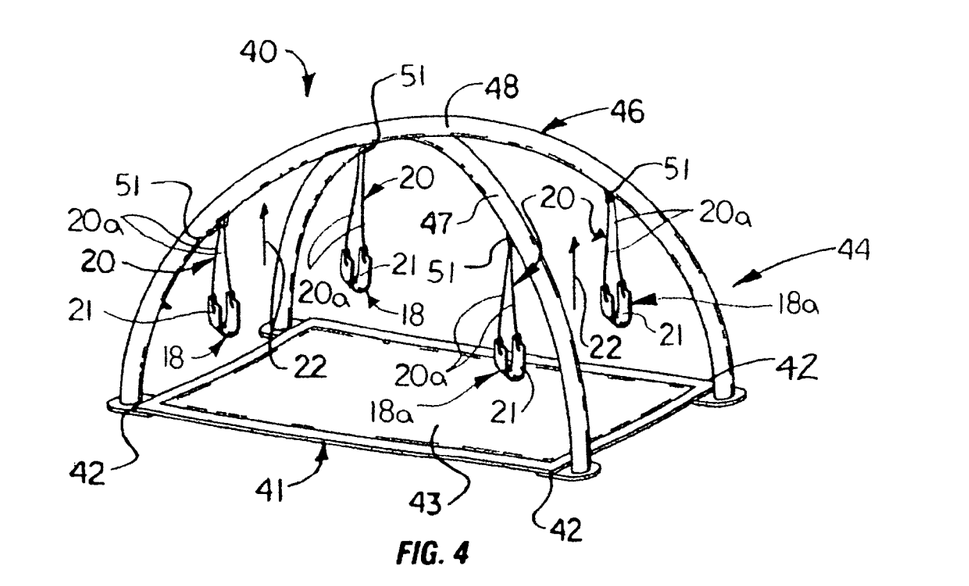
FIG. 4 is a perspective view of an alternative illustrative embodiment of an infant muscle training apparatus.

Referring next to FIG. 4 of the drawings, an alternative illustrative embodiment of the infant muscle training apparatus is generally indicated by reference numeral 40. The apparatus 40 may include an infant play gym 44 which may have a conventional design known by those skilled in the art, with an apparatus base 41 which may be generally elongated and rectangular with apparatus base corners 42. The apparatus base 41 may include an infant mat 43. An apparatus frame 46 may be deployed over the apparatus base 41. The apparatus frame 46 may include a curved lower frame member 47 which extends across a first pair of diagonal apparatus base corners 42 and a curved upper frame member 48 which extends across a second pair of diagonal apparatus base corners 42 and over the lower frame member 47. The lower frame member 47 and the upper frame member 48 may intersect above the center of the infant mat 43.

At least one arm resistance/assistance harness 18 may be suspended from the apparatus frame 46 generally above a first end of the infant mat 43. At least one leg resistance/assistance harness 18a may be suspended from the apparatus frame 46 generally above a second end of the infant mat 43. In some embodiments, a pair of arm resistance/assistance harnesses 18 and a pair of leg resistance/assistance harnesses 18a may be suspended from the apparatus frame 46, as illustrated. Each arm resistance/assistance harness 18 may include an elastic assistance band 20 having a pair of resistance/assistance band strands 20a which are attached to the apparatus frame 46 according to the knowledge of those skilled in the art. In some embodiments, a suspension hook 51 may be attached to the apparatus frame 46. One end of the resistance/assistance band strands 20a of the resistance/assistance band 20 may be tied or otherwise attached to the suspension hook 51. An arm strap 21 may be tied or otherwise attached to the opposite ends of the resistance/assistance band strands 20a of the resistance/assistance band 20. The apparatus 40 may have any alternative design which is consistent with the functional requirements of the apparatus 40.

In exemplary application of the apparatus 40, an infant (not illustrated) lies on the infant mat 43 of the apparatus base 41 beneath the apparatus frame 46. The arms of the infant are extended through the arm straps 21 of the respective arm resistance/assistance harnesses 18. The legs of the infant are extended through the arm straps 21 of the respective leg resistance/assistance harnesses 18a. Accordingly, the resistance/assistance bands 20 of the respective arm resistance/assistance harnesses 18 exert upward resistance/assistance 22 against the infant's arms, lifting the infant's arms from the infant mat 43 and facilitating downward, sideways and upwards movement of the infant's arms. In like manner, the resistance/assistance bands 20 of the respective leg resistance/assistance harnesses 18a exert upward resistance/assistance 22 against the infant's legs, lifting the infant's legs from the infant mat 43 and facilitating downward, sideways and upwards movement of the infant's legs. Continual or repeated upward and sideways exertion of pressure as facilitated by the resistance/assistance bands 20 of the arm resistance/assistance harnesses 18 and the leg resistance/assistance harnesses 18a strengthens the muscles in the arms and legs, respectively, of the infant. The foregoing procedure may be implemented as often as is necessary over a period of weeks or months to gradually strengthen the muscles in the arms 35 of the infant 34. In some applications, the procedure may be applied about 1~4 times per day over a period of days, weeks or months until the strength of the infant's arms and legs improves. The procedure may be continued for an indefinite period of time to maintain the strength of the infant's arms and legs. In some applications, the infant may exert pressure against the arm resistance/assistance harnesses 18 and the leg resistance/assistance harnesses 18a, strengthening the muscles in the arms and legs, respectively, of the infant.

Figure 4A:
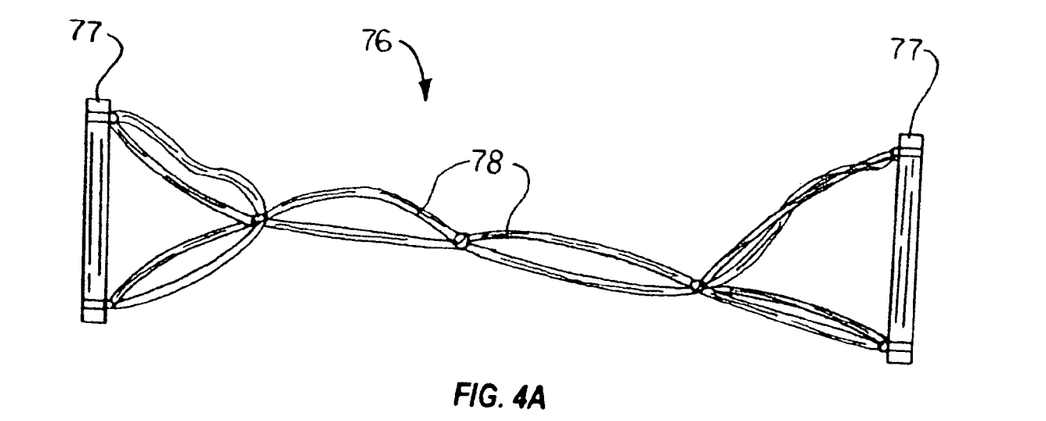
FIG. 4A is a top view of another alternative illustrative embodiment of an infant muscle training apparatus.

Referring next to FIG. 4A of the drawings, another alternative illustrative embodiment of an infant muscle training apparatus is generally indicated by reference numeral 76. The apparatus 76 may include a pair of generally spaced-apart apparatus handles 77. Elastic resistance/assistance bands 78 may connect the apparatus handles 77. The apparatus handles 77 may have a width or diameter which is suitable for being gripped by an infant (not illustrated). Accordingly, in exemplary application of the apparatus 76, a caregiver (not illustrated) holds the apparatus 76 typically at the center of the resistance/assistance bands 78 over the head of an infant (not illustrated). The infant grips the apparatus handles 77 and the caregiver lifts the infant's arms over his or her head. Thus, since he or she no longer needs to oppose gravity, the infant can move his or her arms freely and pull the apparatus handles 77 downwardly toward himself or herself. This action may cause the resistance/assistance bands 78 of the apparatus 76 to draw the apparatus handles 77 toward each other against the efforts of the infant to move the apparatus handles 77 away from each other. Therefore, the resistance which the resistance/assistance bands 78 impart against the apparatus handles 77 strengthens the arm, shoulder and chest muscles of the infant. A caregiver (not illustrated) may direct the infant in moving his or her arms in such a manner that the apparatus handles 77 are drawn away from each other against the resistance imparted by the resistance/assistance bands 78. The foregoing procedure may be implemented as often as is necessary over a period of weeks or months to gradually strengthen the muscles in the arms, shoulders and chest of the infant. In some applications, the procedure may be applied about 1~4 times per day over a period of days, weeks or months until the strength of the infant's arms improves. The procedure may be continued for an indefinite period of time to maintain the strength of the infant's arms, shoulders and chest.

Figure 5:
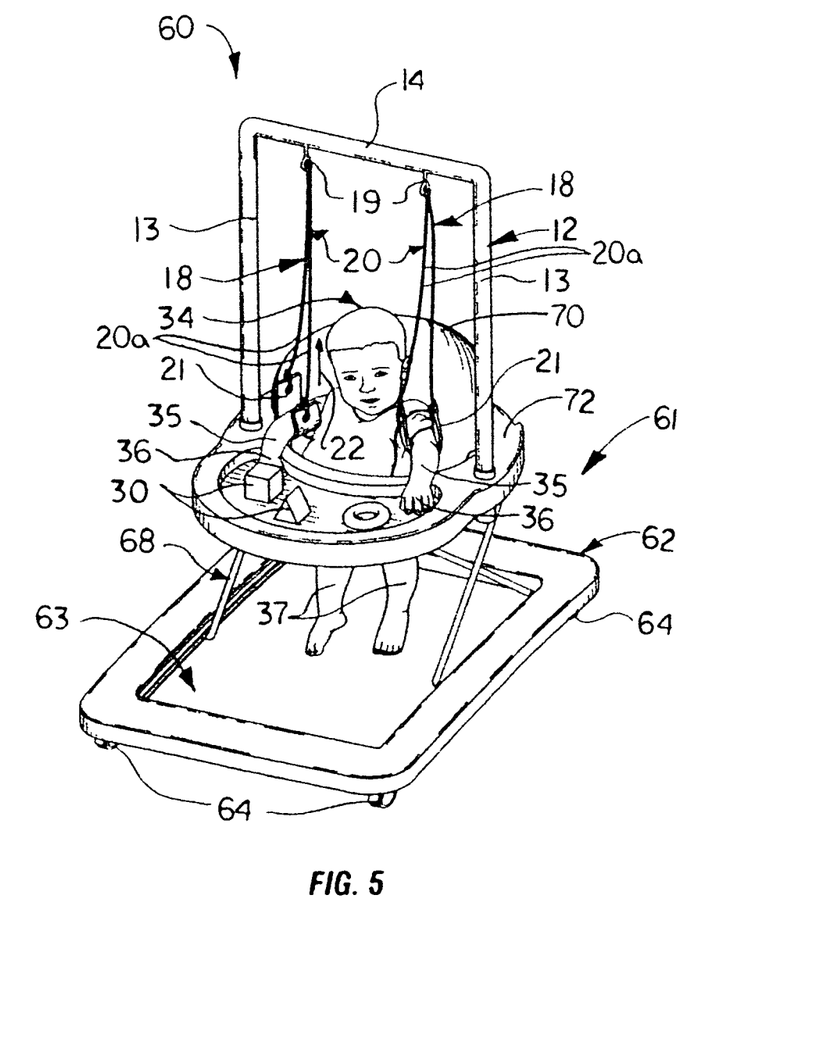
FIG. 5 is a perspective view of an infant-propelled infant walker embodiment of the infant muscle training apparatus, with an infant placed in the apparatus and the infant's arms in a pair of arm assistance harnesses of the apparatus as the infant manipulates toys on a tray of the infant walker in exemplary application of the apparatus.

Referring next to FIG. 5 of the drawings, another alternative illustrative embodiment of the infant muscle training apparatus is generally indicated by reference numeral 60. The apparatus 60 may include an infant-propelled infant walker 61 which may have a conventional infant walker design. The infant walker 61 may have an infant walker base 62 which may be generally elongated and rectangular. The infant walker base 62 may have a central base opening 63 and multiple base wheels 64. An infant walker frame 68 may be supported by the infant walker base 62. An infant walker seat 70 may be supported by the infant walker frame 68. An infant walker tray 72 may be supported by the infant walker seat 70. An upward-standing apparatus frame 12 may extend from the infant walker tray 72. In some embodiments, the apparatus frame 12 may have a design which is similar to the apparatus frame 12 of the apparatus 1 which was heretofore described with respect to FIGS. 1 and 2, with a pair of generally elongated, parallel, spaced-apart, upward-standing side frame members 13 which extend from the infant walker tray 72; a connecting frame member 14 which connects the side frame members 13; and a pair of adjacent arm assistance harnesses 18 which are suspended from the connecting frame member 14. The apparatus 60 may have any alternative design which is consistent with the functional requirements of the apparatus 60.

In exemplary application of the apparatus 60, the base wheels 64 on the infant walker base 62 are placed on a floor or other flat support surface (not illustrated). An infant 34 is seated in the infant walker seat 70, with the legs 37 of the infant 34 extending into the base opening 63 of the infant walker base 62. The arms 35 of the infant 34 are extended through the arm straps 21 of the respective arm assistance harnesses 18. Toys 30 may be placed on the infant walker tray 72 of the infant walker 61 to engage the attention and interest of the infant 34. Accordingly, as the infant 34 manipulates the toys 30 on the infant chair tray 27 using his or her hands 36, the assistance bands 20 of the respective arm resistance harnesses 18 apply upward assistance 22 against the arms 35 of the infant 34 to raise the infant's arms 35 from the surface of the infant chair tray 27. The infant 34 may therefore continually exert a sideways or upward pressure with the upward assistance 22 of the assistance bands 20 to grip and manipulate the toys 30 on the infant chair tray 27. This continual or repeated upward and sideways exertion of the infant's arms 35 as facilitated by the assistance bands 20 strengthens the muscles in the arms 35 of the infant 34. Simultaneously, the infant 34 may travel along the floor or other support surface to exercise his or her legs 37 by walking his or her feet 38 on the floor or other support surface which is exposed through the base opening 63 of the infant walker base 62. The foregoing procedure may be implemented as often as is necessary over a period of weeks or months to gradually strengthen the muscles in the arms 35 and legs 37 of the infant 34. In some applications, the procedure may be applied about 1~4 times per day over a period of days, weeks or months until the strength of the infant's arms 35 and legs 37 improves. The procedure may be continued for an indefinite period of time to maintain the strength of the infant's arms 35 and legs 37.

It will be appreciated by those skilled in the art that the apparatus 1 (FIGS. 1-3), the apparatus 40 (FIG. 4), the apparatus 76 (FIG. 4A) and the apparatus 60 (FIG. 5) may be used as part of a comprehensive infant muscle training program. For example, during an initial period or phase of the infant's growth or development, the apparatus 76 (FIG. 4A) may initially be used to strengthen the arms or legs (if a harness is used) of an infant. As the infant grows older, the apparatus 40 (FIG. 4) may be used to strengthen the arms and/or legs of the infant. After he or she outgrows the need for the apparatus 40 and gains the ability to sit upright in a chair, the infant may be trained using the apparatus 1 with the infant chair 24 (FIGS. 1-3). Finally, after it has developed a degree of mobility through the ability to move his or her legs, the infant may be trained using the apparatus 60 with the infant walker 61 (FIG. 5).

Figure 6:
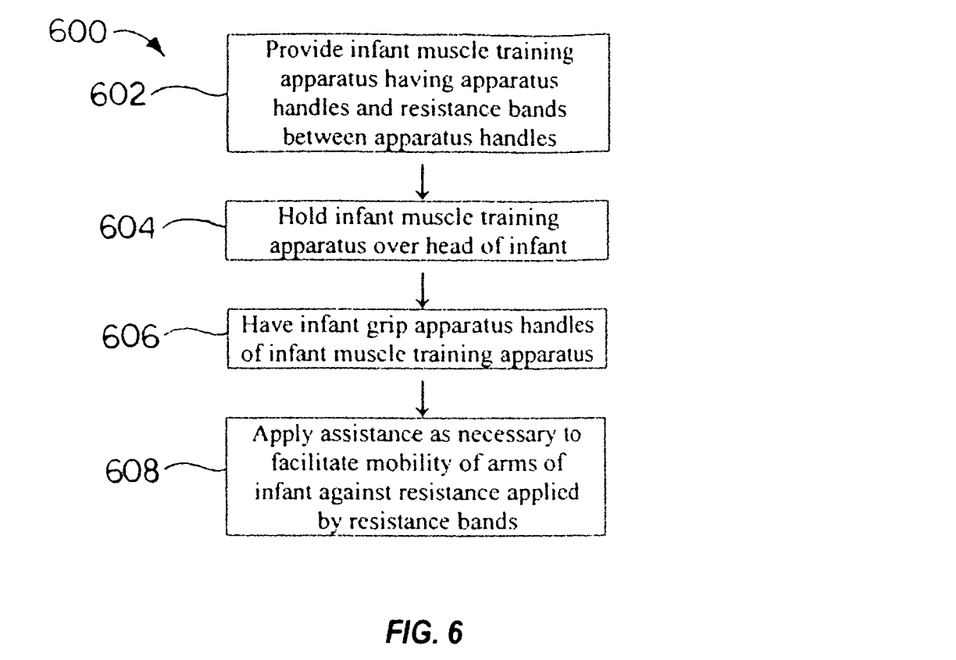
FIG. 6 is a flow diagram of an illustrative embodiment of an infant muscle training method.

Referring next to FIG. 6 of the drawings, a flow diagram of an illustrative embodiment of an infant muscle training method is generally indicated by reference numeral 600. In block 602, an infant muscle training apparatus having apparatus handles and resistance bands connecting the apparatus handles is provided. In some applications, the muscle training apparatus may have a design which is similar to that of the infant muscle training apparatus 1 in FIG. 4A. In block 604, the infant muscle training apparatus is held over the head of the infant. In block 606, the infant grips the apparatus handles of the infant muscle training apparatus. In block 608, assistance is applied as necessary to facilitate mobility of the arms of the infant against the resistance applied by the resistance bands of the infant muscle training apparatus. This action strengthens muscles in the arms, shoulders and chest of the infant. In some applications, the method may be implemented about 1~4 times per day over a period of days, weeks or months until the strength of the infant's arms, shoulders and chest improves and may be continued for an indefinite period of time to maintain the strength of the infant's arm, shoulder and chest muscles.

Figure 6A:
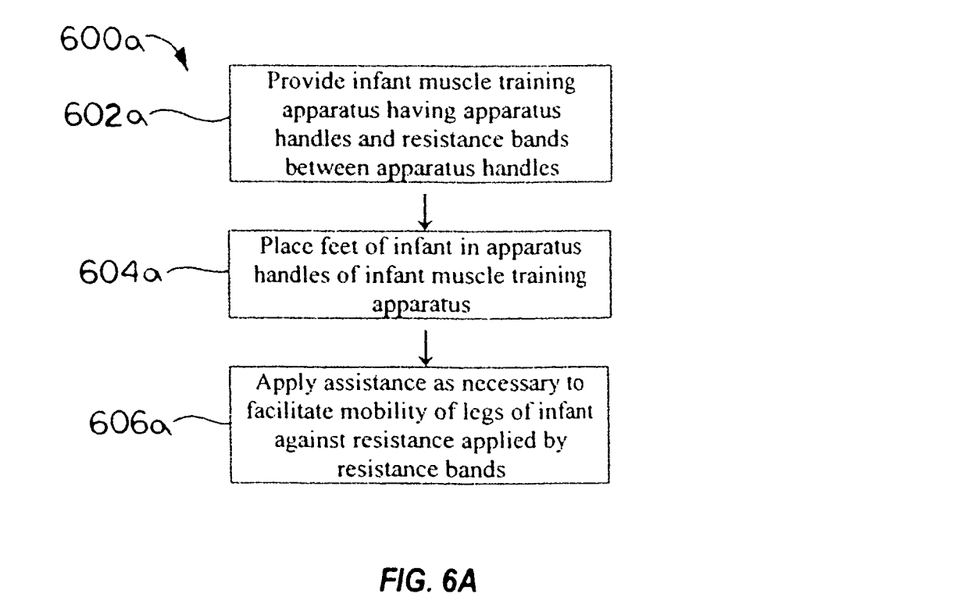
FIG. 6A is a flow diagram of an alternative illustrative embodiment of an infant muscle training method.

Referring next to FIG. 6A of the drawings, a flow diagram of an alternative illustrative embodiment of an infant muscle training method is generally indicated by reference numeral 600a. In block 602a, an infant muscle training apparatus having apparatus handles and resistance bands between the apparatus handles is provided. In block 604a, the feet of an infant are placed in the apparatus handles of the infant muscle training apparatus. In block 606a, assistance is applied as necessary to facilitate mobility of the legs of the infant against the resistance applied by the resistance bands of the infant muscle training apparatus. This action strengthens muscles in the legs of the infant. In some applications, the method may be implemented about 1~4 times per day over a period of days, weeks or months until the strength of the infant's legs improves and may be continued for an indefinite period of time to maintain the strength of the infant's legs.

Figure 7:
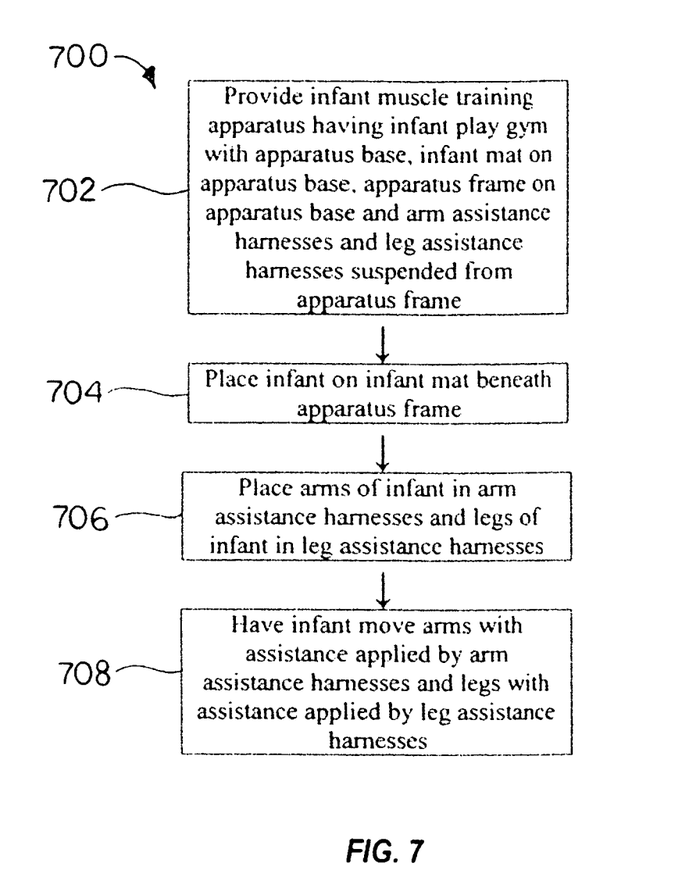
FIG. 7 is a flow diagram of another alternative illustrative embodiment of the infant muscle training method.

Referring next to FIG. 7 of the drawings, a flow diagram of an alternative illustrative embodiment of the infant muscle training method is generally indicated by reference numeral 700. In block 702, an infant muscle training apparatus having an infant play gym with an apparatus base having an infant mat, an apparatus frame over the apparatus base and arm assistance harnesses and leg assistance harnesses suspended from the apparatus frame is provided. In some applications, the muscle training apparatus may have a design which is similar to that of the infant muscle training apparatus 40 in FIG. 4. In block 704, an infant is placed on the infant mat beneath the apparatus frame. In block 706, the arms of the infant are placed in the arm assistance harnesses and the legs of the infant are placed in the leg assistance harnesses. In block 708, the infant moves his or her arms with the assistance applied by the arm assistance harnesses and his or her legs with the assistance applied by the leg assistance harnesses. In some applications, the method may be implemented about 1~4 times per day over a period of days, weeks or months until the strength of the infant's arms and legs improves and may be continued for an indefinite period of time to maintain the strength of the infant's arm and leg muscles.

Figure 8:
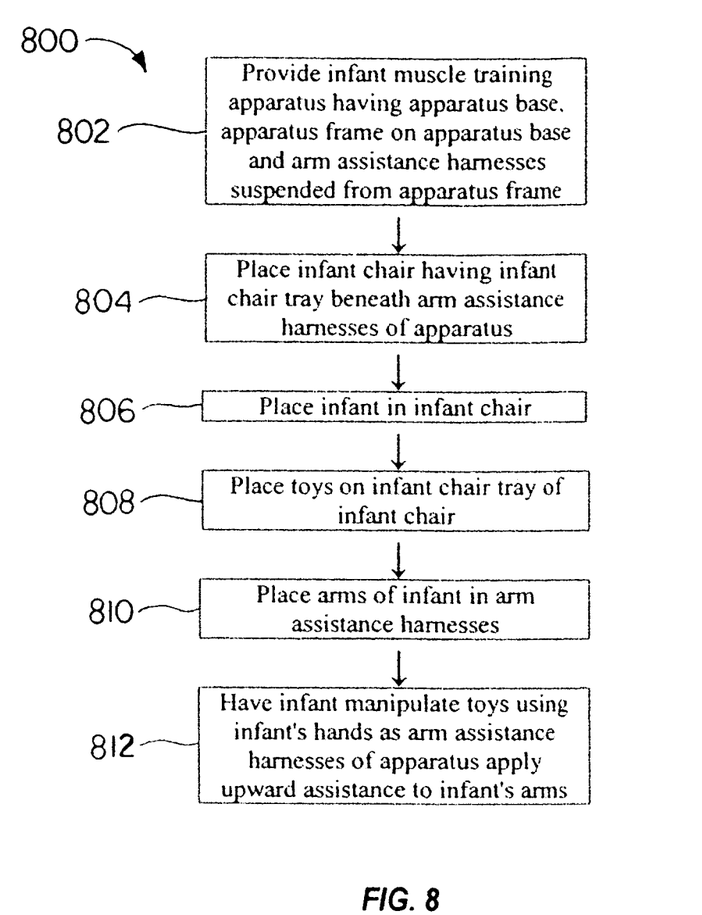
FIG. 8 is a flow diagram of another alternative illustrative embodiment of the infant muscle training method.

Referring next to FIG. 8 of the drawings, a flow diagram of another alternative illustrative embodiment of the infant muscle training method is generally indicated by reference numeral 800. In block 802, an infant muscle training apparatus having an apparatus base, an apparatus frame on the apparatus base and arm assistance harnesses suspended from the apparatus frame is provided. In some applications, the muscle training apparatus may have a design which is similar to that of the infant muscle training apparatus 1 in FIGS. 1-3. In block 804, an infant chair having an infant chair tray is placed beneath the arm assistance harnesses of the apparatus. In block 806, an infant is placed in the infant chair. In block 808, toys are placed on the infant chair tray of the infant chair. In block 810, the arms of the infant are placed in the arm assistance harnesses of the apparatus. In block 812, the infant manipulates the toys on the infant chair tray of the infant chair using the infant's hands as the arm assistance harnesses of the apparatus apply upward assistance to the infant's arms. In some applications, the method may be implemented about 1~4 times per day over a period of days, weeks or months until the strength of the infant's arms and legs improves and may be continued for an indefinite period of time to maintain the strength of the infant's arm muscles.

Figure 9:
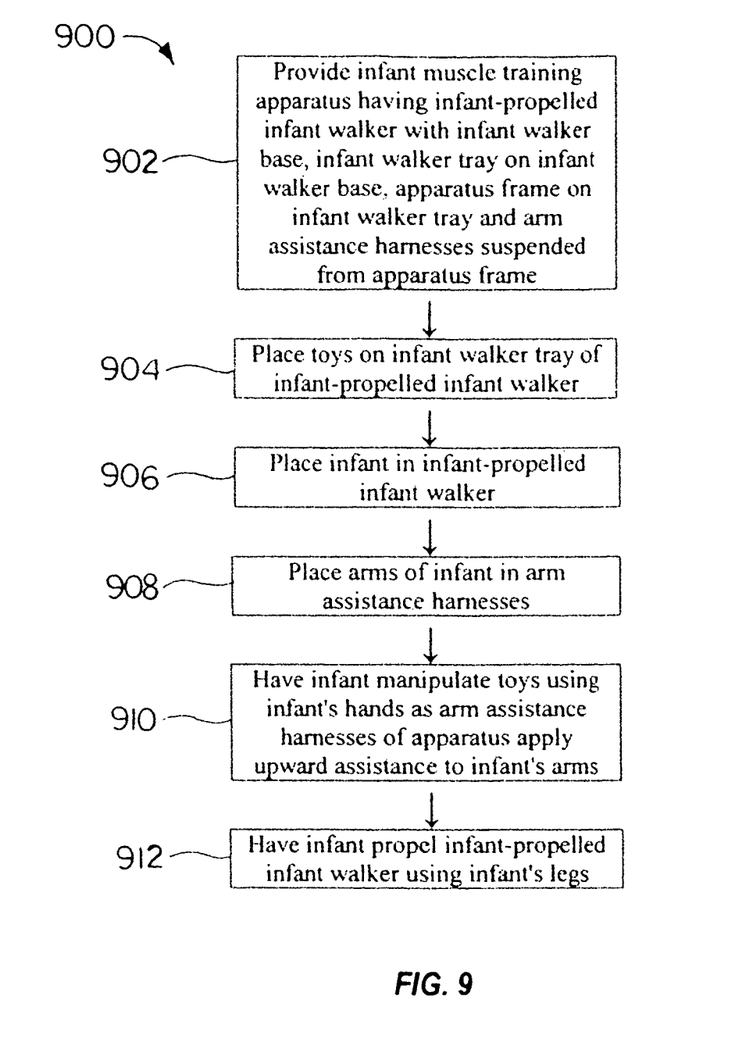
FIG. 9 is a flow diagram of still another alternative illustrative embodiment of the infant muscle training method.

Referring next to FIG. 9 of the drawings, a flow diagram of still another alternative illustrative embodiment of the infant muscle training method is generally indicated by reference numeral 900. In block 902, an infant muscle training apparatus having an infant-propelled infant walker with an infant walker base, an infant walker tray on the infant walker base, an apparatus frame on the infant walker tray and arm assistance harnesses suspended from the apparatus frame is provided. In some applications, the muscle training apparatus may have a design which is similar to that of the infant muscle training apparatus 60 in FIG. 5. In block 904, toys are placed on the infant walker tray of the infant walker. In block 906, an infant is placed in the infant walker. In block 908, the arms of the infant are placed in the arm assistance harnesses. In block 910, the infant manipulates the toys on the infant walker tray using the infant's hands as the arm assistance harnesses of the apparatus apply upward and sideways assistance for the infant's arms. In block 912, the infant propels the infant walker using the infant's legs. In some applications, the method may be implemented about 1~4 times per day over a period of days, weeks or months until the strength of the infant's arms and legs improves and may be continued for an indefinite period of time to maintain the strength of the infant's arm and leg muscles.

Figure 10:
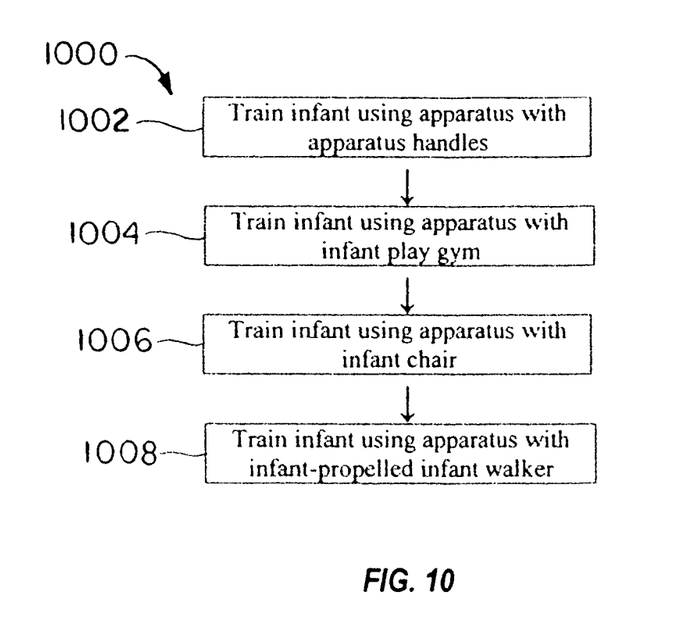
FIG. 10 is a flow diagram of an infant muscle training program method.

Referring next to FIG. 10 of the drawings, a flow diagram of an infant muscle training program method is generally indicated by reference numeral 1000. In block 1002, an infant is trained using an infant muscle training apparatus having apparatus handles and resistance bands connecting the apparatus handles. In some applications, the infant muscle training apparatus may be similar to the infant muscle training apparatus 76 which was heretofore described with respect to FIG. 4A. In some applications, the method may be the same as or similar to that which was heretofore described with respect to FIG. 6. In block 1004, the infant is trained using an infant muscle training apparatus with an infant play gym. In some applications, the infant muscle training apparatus may be similar to the infant muscle training apparatus 40 which was heretofore described with respect to FIG. 4. In some applications, the method may be the same as or similar to that which was heretofore described with respect to FIG. 7. In block 1006, the infant is trained using an infant muscle training apparatus which is placed over an infant chair. In some applications, the infant muscle training apparatus may be similar to the infant muscle training apparatus 1 which was heretofore described with respect to FIGS. 1-3. In some applications, the method may be the same as or similar to that which was heretofore described with respect to FIG. 8. In block 1008, the infant is trained using an infant muscle training apparatus with an infant-propelled infant walker. In some applications, the infant muscle training apparatus may be similar to the infant muscle training apparatus 60 which was heretofore described with respect to FIG. 5. In some applications, the method may be the same as or similar to that which was heretofore described with respect to FIG. 9.

While various illustrative embodiments have been described above, it will be recognized and understood that various modifications can be made and the appended claims are intended to cover all such modifications which may fall within the spirit and scope of the disclosure.

What is claimed is:

1. An infant muscle training apparatus, comprising:
    an apparatus base;
    an apparatus frame carried by the apparatus base;
    at least one assistance harness carried by the apparatus frame, the at least one assistance harness having at least one resilient or elastic assistance band carried by the apparatus frame and a flexible, U-shaped arm strap carried by the at least one assistance band; and
    an infant chair beneath the at least one assistance harness, the infant chair having infant chair legs and an infant chair seat and an infant chair tray carried by the infant chair legs, the at least one assistance harness suspended over the infant chair tray.

2. The infant muscle training apparatus of claim 1 wherein the apparatus frame is height-adjustable with respect to the apparatus base.

3. The infant muscle training apparatus of claim 1 wherein the apparatus base comprises a pair of generally elongated, parallel, spaced-apart side base members and a connecting base member connecting the side base members, and wherein the apparatus frame is carried by the side base members.

4. The infant muscle training apparatus of claim 3 further comprising a pair of frame support members upward-standing from the side base members, respectively, and wherein the apparatus frame is carried by the frame support members, respectively.

5. The infant muscle training apparatus of claim 4 wherein the apparatus frame comprises a pair of side frame members carried by the pair of frame support members, respectively, of the apparatus base and a connecting frame member connecting the pair of side frame members.

6. The infant muscle training apparatus of claim 5 wherein the frame support members of the apparatus base telescopically receive the side frame members, respectively, of the apparatus frame.

7. The infant muscle training apparatus of claim 6 further comprising a first plurality of pin openings in each of the frame support members, a second plurality of pin openings in each of the side frame members and a pin extended through a selected registering pair of the first plurality of pin openings and the second plurality of pin openings.

8. The infant muscle training apparatus of claim 1 wherein the apparatus frame comprises a generally elongated, curved first frame member carried by the apparatus base and a generally elongated, curved second frame member carried by the apparatus base and intersecting the first frame member.

9. The infant muscle training apparatus of claim 8 wherein the at least one assistance harness comprises at least one arm assistance harness and at least one leg assistance harness.

10. The infant muscle training apparatus of claim 1 wherein the apparatus base comprises a wheeled infant walker base and further comprising an infant walker frame carried by the infant walker base, an infant walker seat carried by the infant walker frame and an infant walker tray carried by the infant walker seat, and wherein the apparatus frame is carried by the infant walker tray.

11. An infant muscle training method for an infant having a muscular disease or disorder, comprising:
    providing an infant muscle training apparatus having at least one resilient or elastic band;
    providing an infant chair having an infant chair tray, placing the infant chair generally beneath the at least one resilient or elastic band and placing at least one object on the infant chair tray;
    extending at least one arm of the infant through the at least one resilient or elastic band; and
    having the infant generally apply resistance against the at least one resilient or elastic band, whereby the at least one resilient or elastic band applies upward assistance against the at least one arm of the infant as the infant manipulates the at least one object.

12. The method of claim 11 wherein the providing an infant muscle training apparatus comprises providing an infant muscle training apparatus having a pair of apparatus handles and wherein the at least one band comprises at least one resistance band connecting the apparatus handles and having the infant generally apply resistance against the at least one band comprises having the infant grip the handles and pull the handles against the at least one resistance band.

13. The method of claim 11 wherein the providing an infant muscle training apparatus comprises providing an infant muscle training apparatus having an apparatus base and an apparatus frame carried by the apparatus base and wherein the at least one band comprises at least one assistance band carried by the apparatus frame.

14. The method of claim 13 wherein the providing an infant muscle training apparatus comprises providing an infant muscle training apparatus having a flexible, U-shaped arm strap carried by the at least one assistance band, and wherein extending at least one arm of the infant through the at least one assistance band comprises extending the at least one arm of the infant through the arm strap.

15. The method of claim 11 wherein the providing an infant muscle training apparatus having at least one resilient or elastic band comprises providing an infant muscle training apparatus having an apparatus base and an apparatus frame over the apparatus base and a pair of arm assistance harnesses and a pair of leg assistance harnesses carried by the apparatus frame, and further comprising extending arms of the infant through the arm assistance harnesses and legs of the infant through the leg assistance harnesses.

16. An infant muscle training program, comprising:

training an infant using an infant muscle training apparatus having apparatus handles and at least one resistance band connecting the apparatus handles;

training an infant using an infant muscle training apparatus with an infant play gym and at least one arm assistance harness and at least one leg assistance harness carried by the infant play gym;

training an infant using an infant muscle training apparatus with an infant chair and at least one arm assistance harness suspended over the infant chair; and training an infant using an infant muscle training apparatus with an infant-propelled infant walker having an infant walker tray, an apparatus frame carried by the infant walker tray and at least one arm assistance harness carried by the apparatus frame and suspended over the infant walker tray of the infant walker.

\* \* \* \* \*